(12) United States Patent
Ide et al.

(10) Patent No.: US 10,856,600 B2
(45) Date of Patent: *Dec. 8, 2020

(54) QUICK RELEASE CONNECTOR

(71) Applicant: Riddell, Inc., Des Plaines, IL (US)

(72) Inventors: Thad M. Ide, Chicago, IL (US); Nelson Kraemer, Mount Prospect, IL (US); Ralph J. Infusino, Bloomingdale, IL (US); Vittorio Bologna, Elk Grove Village, IL (US)

(73) Assignee: Riddell, Inc., Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,910

(22) Filed: Oct. 16, 2017

(65) Prior Publication Data
US 2018/0049506 A1  Feb. 22, 2018

Related U.S. Application Data

(63) Continuation of application No. 14/467,618, filed on Aug. 25, 2014, now Pat. No. 9,788,591, which is a
(Continued)

(51) Int. Cl.
*A63B 71/10* (2006.01)
*A42B 1/24* (2006.01)
(Continued)

(52) U.S. Cl.
CPC .............. *A42B 3/20* (2013.01); *A63B 71/081* (2013.01); *A63B 71/10* (2013.01); *F16B 21/12* (2013.01);
(Continued)

(58) Field of Classification Search
CPC .... A42B 3/20; A42B 3/06; A42B 3/00; A63B 71/10; A63B 71/081; A63B 2102/14;
(Continued)

(56) References Cited

U.S. PATENT DOCUMENTS 1,060,220 A   4/1913  White
1,203,564 A   11/1916 April
(Continued)

FOREIGN PATENT DOCUMENTS

CH    692011   1/2002
DE   8321097   10/1983
(Continued)

OTHER PUBLICATIONS

Dzus Catalog, A20 1993 DZUS Fastener Co. Inc. (9 pages).
(Continued)

*Primary Examiner* — Katharine Gracz
(74) *Attorney, Agent, or Firm* — Barnes & Thornburg LLP

(57) ABSTRACT

The present invention is directed to an improved sports helmet including a quick release connector assembly for the faceguard that allows for rapid disconnection of the faceguard from the helmet shell. The connector includes a bracket, and a coupler mechanism featuring an elongated pin, a head component, a spring, a retractable engaging element and a washer. The connector assembly is moveable between a use position, wherein the faceguard is secured to the shell by the bracket and the coupler mechanism, and a released position wherein the bracket and the faceguard are disconnected from the shell. An inwardly directed actuation force that lacks a rotational component is applied to the elongated pin to move from the use position to the released position.

30 Claims, 9 Drawing Sheets

Related U.S. Application Data continuation of application No. 12/082,920, filed on Apr. 15, 2008, now Pat. No. 8,813,269.

(60) Provisional application No. 60/923,603, filed on Apr. 16, 2007.

(51) Int. Cl.
*A42B 3/20* (2006.01)
*A63B 71/08* (2006.01)
*F16B 21/12* (2006.01)
*A63B 102/24* (2015.01)
*A63B 102/14* (2015.01)
*A63B 102/22* (2015.01)

(52) U.S. Cl.
CPC ....... *A63B 2102/14* (2015.10); *A63B 2102/22* (2015.10); *A63B 2102/24* (2015.10); *A63B 2209/10* (2013.01); *A63B 2243/007* (2013.01); *Y10T 403/602* (2015.01)

(58) Field of Classification Search
CPC ............ A63B 2102/24; A63B 2102/22; A63B 2209/10; A63B 2243/007; A63B 2243/0025; F16B 21/12; Y10T 403/602
USPC ................. 2/410–414, 422, 424, 425, 6.1–8; D29/102–106, 108; 24/110, 573.11, 453, 24/606, 607; 411/348, 322
See application file for complete search history.

(56) References Cited

U.S. PATENT DOCUMENTS

| | | |
|---|---|---|
| 1,262,818 A | 4/1918 | McGill |
| 1,449,183 A | 3/1923 | Jonhstone |
| 1,522,952 A | 1/1925 | Goldsmith |
| 1,655,007 A | 1/1928 | Boettge |
| 1,691,202 A | 11/1928 | Van |
| 1,705,879 A | 3/1929 | Rodgers |
| 1,868,926 A | 7/1932 | Tatore |
| 1,892,943 A | 1/1933 | Geyer |
| 2,140,716 A | 12/1938 | Pryale |
| 2,250,275 A | 7/1941 | Riddell |
| 2,296,335 A | 9/1942 | Brady |
| 2,354,840 A | 8/1944 | Seletz |
| 2,373,083 A | 4/1945 | Brewster |
| 2,476,339 A | 7/1949 | Opel |
| 2,515,807 A | 7/1950 | Spooner |
| 2,570,182 A | 10/1951 | Daly et al. |
| 2,688,747 A | 9/1954 | Marx |
| 2,758,304 A | 8/1956 | McGowan |
| 2,768,380 A | 10/1956 | Golomb |
| 2,779,228 A | 1/1957 | Meepos et al. |
| 2,785,405 A | 3/1957 | Snyder |
| D180,239 S | 5/1957 | McMurry |
| 2,850,740 A | 9/1958 | Adams |
| 2,861,272 A | 11/1958 | Stuart et al. |
| 2,867,811 A | 1/1959 | Jones |
| 2,901,804 A | 9/1959 | Williams |
| 2,904,645 A | 9/1959 | Sarles |
| 2,969,546 A | 1/1961 | Morgan, Jr. |
| 2,985,883 A | 5/1961 | Marietta |
| 2,986,739 A | 6/1961 | Rozzi |
| 3,039,108 A | 6/1962 | Lohrenz |
| 3,097,559 A | 7/1963 | Chapman |
| 3,106,716 A | 10/1963 | Beebe |
| 3,113,318 A | 12/1963 | Marietta |
| 3,117,484 A | 1/1964 | Myers |
| 3,139,624 A | 7/1964 | Humphrey |
| 3,166,761 A | 1/1965 | Strohm |
| 3,167,783 A | 2/1965 | Wolfe |
| 3,186,004 A | 6/1965 | Carlini |
| 3,187,342 A | 6/1965 | Aileo |
| 3,216,023 A | 11/1965 | Morgan |
| 3,227,029 A | 1/1966 | Devine et al. |
| 3,263,236 A | 8/1966 | Humphrey |
| 3,274,613 A | 9/1966 | Sowle |
| 3,283,336 A | 11/1966 | Critser |
| 3,327,313 A | 6/1967 | Oliver |
| 3,447,162 A | 6/1969 | Aileo |
| 3,535,752 A | 10/1970 | Dzus |
| 3,548,409 A | 12/1970 | Aileo |
| 3,548,410 A | 12/1970 | Parker |
| 3,575,079 A | 4/1971 | Smith |
| 3,609,764 A | 10/1971 | Morgan |
| 3,619,813 A | 11/1971 | Marchello |
| 3,713,640 A | 1/1973 | Margan |
| 3,729,746 A | 5/1973 | Humphrey |
| 3,761,959 A | 10/1973 | Dunning |
| 3,783,450 A * | 1/1974 | O'Connor ............. A42B 3/124 2/421 |
| 3,787,895 A | 1/1974 | Belvedere |
| 3,793,241 A | 2/1974 | Kyle et al. |
| D230,911 S | 3/1974 | Ispas, Jr. |
| 3,818,508 A | 6/1974 | Lammers et al. |
| 3,827,110 A | 8/1974 | Dzus, Sr. et al. |
| 3,849,801 A | 11/1974 | Holt et al. |
| 3,854,146 A | 12/1974 | Dunning |
| 3,882,547 A | 5/1975 | Morgan |
| 3,889,296 A | 6/1975 | Martin |
| 3,916,446 A | 11/1975 | Gooding |
| 3,934,271 A | 1/1976 | Rhee |
| 3,994,020 A | 11/1976 | Villari |
| 3,994,021 A | 11/1976 | Villari et al. |
| 3,994,022 A | 11/1976 | Villari et al. |
| 4,023,213 A | 5/1977 | Rovani |
| 4,028,743 A | 6/1977 | Christensen |
| 4,044,400 A | 8/1977 | Lewicki et al. |
| 4,060,855 A | 12/1977 | Rappleyea |
| 4,075,714 A | 2/1978 | Ryder et al. |
| 4,086,664 A | 5/1978 | Humphrey et al. |
| 4,101,983 A | 7/1978 | Dera et al. |
| 4,136,403 A | 1/1979 | Walther et al. |
| 4,204,566 A | 5/1980 | Kirrish et al. |
| 4,233,687 A | 11/1980 | Lancelloti |
| 4,250,600 A | 2/1981 | Gunther |
| 4,262,394 A | 4/1981 | Wright |
| 4,272,853 A | 6/1981 | Schuessler |
| 4,279,038 A | 7/1981 | Bruckner et al. |
| 4,287,613 A | 9/1981 | Schulz |
| D267,287 S | 12/1982 | Gooding |
| 4,363,140 A | 12/1982 | Correale |
| 4,370,759 A | 2/1983 | Zide |
| 4,390,995 A | 7/1983 | Walck |
| 4,398,306 A | 8/1983 | Gooding |
| 4,404,690 A | 9/1983 | Farquharson |
| D271,249 S | 11/1983 | Farquharson |
| 4,461,044 A | 7/1984 | Reiterman |
| 4,475,248 A | 10/1984 | L'Abbe et al. |
| 4,477,929 A | 10/1984 | Mattsson |
| 4,566,137 A | 1/1986 | Gooding |
| 4,633,531 A | 1/1987 | Nimmons |
| 4,646,368 A | 3/1987 | Infusino et al. |
| 4,651,356 A | 3/1987 | Zide |
| 4,677,694 A | 7/1987 | Crow |
| 4,692,947 A | 9/1987 | Black et al. |
| 4,706,305 A | 11/1987 | Cho |
| 4,718,127 A | 1/1988 | Rittmann et al. |
| 4,741,054 A | 5/1988 | Mattes |
| 4,744,107 A | 5/1988 | Fohl |
| 4,774,729 A | 10/1988 | Coates et al. |
| 4,794,652 A | 1/1989 | Piech von Planta et al. |
| 4,808,469 A | 2/1989 | Hiles |
| 4,831,668 A | 5/1989 | Schulz |
| 4,837,866 A | 6/1989 | Rector et al. |
| 4,853,980 A | 8/1989 | Zarotti |
| 4,866,792 A | 9/1989 | Arai |
| 4,885,806 A | 12/1989 | Heller |
| 4,885,807 A | 12/1989 | Snow, Jr. |
| 4,896,989 A | 1/1990 | Swager |
| 4,903,346 A | 2/1990 | Reddermann et al. |
| 4,916,759 A | 4/1990 | Arai |
| 4,930,961 A | 6/1990 | Weis |

(56) References Cited

U.S. PATENT DOCUMENTS

| | | | |
|---|---|---|---|
| D309,512 S | 7/1990 | Crow | |
| 4,947,490 A | 8/1990 | Hayden | |
| 5,014,365 A | 5/1991 | Schulz | |
| 5,035,009 A | 7/1991 | Wingo, Jr. et al. | |
| 5,061,112 A | 10/1991 | Monford, Jr. | |
| 5,083,321 A | 1/1992 | Davidsson | |
| 5,093,936 A | 3/1992 | Copeland et al. | |
| 5,093,939 A | 3/1992 | Noyerie et al. | |
| 5,100,272 A | 3/1992 | Jadoul et al. | |
| 5,101,517 A | 4/1992 | Douglas | |
| 5,129,108 A | 7/1992 | Copeland et al. | |
| 5,136,728 A | 8/1992 | Kamata | |
| 5,142,700 A | 8/1992 | Reed | |
| D332,507 S | 1/1993 | Anderson et al. | |
| 5,175,889 A | 1/1993 | Infusino | |
| 5,177,816 A | 1/1993 | Schmidt et al. | |
| 5,263,203 A | 11/1993 | Kraemer et al. | |
| 5,263,204 A | 11/1993 | Butsch | |
| 5,267,353 A | 12/1993 | Milligan | |
| 5,293,649 A | 3/1994 | Corpus | |
| RE34,699 E | 8/1994 | Copeland et al. | |
| D350,710 S | 9/1994 | Keiffer | |
| 5,347,660 A | 9/1994 | Zide et al. | |
| D357,555 S | 4/1995 | Brueckner et al. | |
| 5,409,323 A | 4/1995 | Greene | |
| 5,418,257 A | 5/1995 | Weisman | |
| 5,452,979 A | 9/1995 | Cosenza | |
| 5,461,730 A | 10/1995 | Carrington | |
| D364,487 S | 11/1995 | Tutton et al. | |
| 5,494,323 A | 2/1996 | Huang | |
| 5,502,843 A | 4/1996 | Strickland | |
| 5,539,936 A | 7/1996 | Thomas | |
| 5,553,330 A | 9/1996 | Carveth | |
| 5,594,974 A | 1/1997 | Wattron et al. | |
| D378,236 S | 2/1997 | Zanotto et al. | |
| D378,624 S | 3/1997 | Chartrand | |
| D382,671 S | 8/1997 | Shewchenko | |
| D383,953 S | 9/1997 | DeFilippo | |
| 5,675,875 A | 10/1997 | Servatius | |
| 5,713,082 A | 2/1998 | Bassette et al. | |
| 5,724,681 A | 3/1998 | Sykes | |
| 5,732,414 A | 3/1998 | Monica | |
| 5,737,770 A | 4/1998 | Chen | |
| 5,790,988 A | 8/1998 | Guadagnino, Jr. et al. | |
| 5,794,274 A | 8/1998 | Kraemer | |
| 5,799,337 A | 9/1998 | Brown | |
| D406,399 S | 3/1999 | Hohdorf | |
| 5,883,145 A | 3/1999 | Hurley et al. | |
| D408,236 S | 4/1999 | Rennick | |
| 5,915,537 A | 6/1999 | Dallas et al. | |
| 5,930,840 A | 8/1999 | Arai | |
| 5,938,878 A | 8/1999 | Hurley et al. | |
| 5,946,735 A | 9/1999 | Bayes | |
| 5,953,761 A | 9/1999 | Jurga et al. | |
| 5,963,990 A | 10/1999 | White | |
| 5,966,744 A | 10/1999 | Smith | |
| 6,047,400 A | 4/2000 | Spencer | |
| 6,054,005 A | 4/2000 | Hurley et al. | |
| 6,070,271 A | 6/2000 | Williams | |
| 6,073,271 A | 6/2000 | Alexander et al. | |
| 6,079,053 A | 6/2000 | Clover, Jr. et al. | |
| 6,081,932 A | 7/2000 | Kraemer | |
| 6,128,786 A | 10/2000 | Maddux et al. | |
| 6,138,284 A | 10/2000 | Arai | |
| 6,189,156 B1 | 2/2001 | Loiars | |
| 6,199,219 B1 | 3/2001 | Silken et al. | |
| 6,219,850 B1 | 4/2001 | Halstead et al. | |
| 6,226,801 B1 | 5/2001 | Alexander et al. | |
| D445,962 S | 7/2001 | Brignone et al. | |
| 6,256,798 B1 | 7/2001 | Egolf | |
| 6,261,042 B1 | 7/2001 | Pratt | |
| 6,272,692 B1 | 8/2001 | Abraham | |
| D448,526 S | 9/2001 | Brignone et al. | |
| 6,282,726 B1 | 9/2001 | Noyerie et al. | |
| D448,890 S | 10/2001 | Brignone et al. | |
| 6,298,483 B1 | 10/2001 | Schiebl et al. | |
| 6,298,497 B1 | 10/2001 | Chartrand | |
| 6,301,719 B1 | 10/2001 | Goodhand et al. | |
| 6,324,701 B1 | 12/2001 | Alexander | |
| D453,399 S | 2/2002 | Racine | |
| 6,360,376 B1 | 3/2002 | Carrington | |
| 6,370,699 B1 | 4/2002 | Halstead et al. | |
| 6,386,789 B1 | 5/2002 | Chausse et al. | |
| D459,032 S | 6/2002 | Gatellet | |
| D459,554 S | 6/2002 | Gatellet | |
| D459,555 S | 6/2002 | Gatellet | |
| 6,438,762 B1 | 8/2002 | Jenkins | |
| 6,438,763 B2 | 8/2002 | Guay et al. | |
| 6,446,270 B1 * | 9/2002 | Durr | A42B 3/061 2/412 |
| D465,067 S | 10/2002 | Ide et al. | |
| 6,481,024 B1 | 11/2002 | Grant | |
| D466,651 S | 12/2002 | Halstead et al. | |
| 6,499,139 B1 | 12/2002 | Brown et al. | |
| 6,499,147 B2 | 12/2002 | Schiebl et al. | |
| D475,486 S | 6/2003 | Ide et al. | |
| 6,701,535 B2 | 3/2004 | Dobbie et al. | |
| 6,722,711 B2 | 4/2004 | Kitzis | |
| D492,818 S | 7/2004 | Ide et al. | |
| D495,838 S | 9/2004 | Arai | |
| 6,826,509 B2 | 11/2004 | Crisco, III et al. | |
| 6,893,184 B2 | 5/2005 | Mills et al. | |
| 6,934,971 B2 | 8/2005 | Ide et al. | |
| D509,928 S | 9/2005 | Barnoski | |
| 6,938,272 B1 | 9/2005 | Brown | |
| D511,026 S | 10/2005 | Ide et al. | |
| D512,534 S | 12/2005 | Maddux et al. | |
| 7,146,652 B2 | 12/2006 | Ide et al. | |
| 7,240,376 B2 | 7/2007 | Ide et al. | |
| 7,328,462 B1 | 2/2008 | Straus | |
| D575,458 S | 8/2008 | Ho | |
| D582,607 S | 12/2008 | Ferrara et al. | |
| D587,407 S | 2/2009 | Nimmons et al. | |
| D587,852 S | 3/2009 | Nimmons | |
| D587,853 S | 3/2009 | Nimmons | |
| D587,854 S | 3/2009 | Nimmons et al. | |
| D587,855 S | 3/2009 | Nimmons et al. | |
| D603,099 S | 10/2009 | Bologna et al. | |
| D603,100 S | 10/2009 | Bologna | |
| D616,154 S | 5/2010 | Daniel | |
| D625,050 S | 10/2010 | Chen | |
| D628,748 S | 12/2010 | Stewart | |
| D629,162 S | 12/2010 | Daniel | |
| D633,658 S | 3/2011 | Daniel | |
| 7,954,177 B2 | 6/2011 | Ide et al. | |
| D654,629 S | 2/2012 | Chou et al. | |
| D654,630 S | 2/2012 | Chou et al. | |
| 2002/0104533 A1 | 8/2002 | Kalhok et al. | |
| 2002/0174480 A1 | 11/2002 | Lombard | |
| 2003/0188375 A1 | 10/2003 | Wilson et al. | |
| 2003/0209241 A1 | 11/2003 | Fournier et al. | |
| 2004/0025231 A1 | 2/2004 | Ide et al. | |
| 2004/0032099 A1 | 2/2004 | Szendel | |
| 2006/0182513 A1 | 8/2006 | Dortch | |
| 2009/0265841 A1 | 10/2009 | Ferrara | |
| 2010/0005573 A1 | 1/2010 | Rudd et al. | |
| 2011/0209272 A1 | 9/2011 | Drake | |
| 2012/0011639 A1 | 1/2012 | Beauchamp et al. | |
| 2012/0079646 A1 | 4/2012 | Belanger et al. | |

FOREIGN PATENT DOCUMENTS

| | | |
|---|---|---|
| DE | 3338188 | 5/1985 |
| DE | 3603234 | 8/1987 |
| DE | 19745960 | 4/1999 |
| EP | 512193 | 11/1992 |
| GB | 256430 | 8/1926 |
| GB | 1354719 | 6/1974 |
| GB | 2201727 | 9/1988 |
| JP | 56-53735 | 5/1981 |
| JP | 57-205511 | 12/1982 |
| JP | 59-37323 | 3/1984 |
| JP | 3-22024 | 3/1991 |
| JP | 05-132809 | 5/1993 |

(56) References Cited

FOREIGN PATENT DOCUMENTS

| JP | 05-72922 | 10/1993 |
|---|---|---|
| JP | H5-280518 | 10/1993 |
| JP | 07-109609 | 4/1995 |
| JP | 07-126908 | 5/1995 |
| JP | 10-195707 | 7/1998 |
| JP | 2001-020121 | 1/2001 |
| WO | WO 9534229 | 12/1995 |
| WO | WO 0152676 | 7/2001 |

OTHER PUBLICATIONS

*Riddell, Inc.* v. *Kranos Corporation d/b/a Schutt Sports* (N.D. IL 1-16-cv-04496)—Initial Invalidity Contentions, Ex. C for the '293 patent, dated Sep. 23, 2016 (52 Pages).
*Riddell, Inc.* v. *Kranos Corporation d/b/a Schutt Sports* (N.D. IL 1-16-cv-04496)—Final Invalidity Contentions, Ex. C for the '293 patent, dated Dec. 20, 2016 (128 Pages).
Petition for Inter Partes Review of U.S. Pat. No. 8,813,269, Aug. 19, 2016 (90 pages).
Patent Owner's Preliminary Response, Case No. IPR2016-01649, U.S. Pat. No. 8,813,269 (61 pages).
Decision, Institution of Inter Partes Review 37 C.F.R. § 42.108, Entered Feb. 10, 2017, Case IPR2016-01649, Patent 8,813,269 B2 (33 pages).
Declaration of Michael W. Irvin dated Aug. 30, 2012.
Schutt Photographs (Published Apr. 2001) (Exhibit 1 of Irvin Declaration).
Schutt Sports, 2002 Football Catalog (Exhibit 2 of Irvin Declaration).
Supplemental Declaration of Michael W. Irvin Under 37 CFR § 1.132 and MPEP 2616 dated Dec. 27, 2012.
Rawlings Fall/Winter Sports Catalog 1926-1927.
Expert Report of Mr. Rovani filed Dec. 15, 2009, *Riddell, Inc,* v. *Schutt Sports, Inc.*; U.S. District Court for the W.D. of Wisconsin; 08-cv-711.
Claim Construction Opinion and Order; *Riddell, Inc.* v. *Schutt Sports, Inc.*; U.S. District Court for the W.D. of Wisconsin; 08-cv-711; dated Jul. 10, 2009.
Schutt's Response to Riddell's First Set of Interrogatories; including patent invalidity contentions and exhibit with invalidity claim charts; dated Mar. 13, 2009.
Schutt's Answer and Affirmative Defenses; *Riddell, Inc.* v. *Schutt Sports, Inc*; U.S. District Court for the W.D. of Wisconsin; 08-cv-711; dated Feb. 16, 2009.
Plaintiff Riddell's Brief in Support of Proposed Claim Constructions; dated Apr. 29, 2009.
Plaintiff Riddell's Opinion Brief to Defendant Schutt's Proposed Claim Constructions; dated May 18, 2009.
Defendant Schutt's First Supplemental Responses to Plaintiff Riddell's First Set of Interrogatories.
Four Photographs of *Riddell, Inc.'s* VSR4 football helmet which was commercially available prior to May 1, 2001.
U.S. Appl. No. 10/151,245, filed May 21, 2002, Lombard.
Face-Off Lacrosse Yearbook 2003, Spring 2003, three pages, vol. 10.
Declaration of co-inventor Thad M. Ide, dated Oct. 28, 2004, 2 pages with photographs of seven (7) helmets bearing labels A1-A6, B1-B5, C1-7, D1-D5, E1-E5, F1-F5, G1-G5, 22 pages (commercially available prior to Apr. 29, 2003) see p. 2 of declaration.
Newman, James A., "A Proposed New Biochemical Head Injury Assessment Function-The Maximum Power Index", Stapp Paper No. OOS-80, 44th Stapp Car Crash Conference Proceedings-Copyright 2000 The Staff Association; published prior to (critical date) Sep. 8, 2005 (Abstract only).
Newman, James A., "A New Biochemical Assessment of Mild Traumatic Brain Injury Part 2—Results and Communications", published prior to (critical date) Sep. 8, 2005 (Abstract only).
Newman, James A., "A New Biochemical Assessment of Mild Traumatic Brain Injury Part 1—Methodology", published prior to (critical date) Sep. 8, 2005 (Abstract only).

\* cited by examiner

QUICK RELEASE CONNECTOR

CROSS-REFERENCE TO RELATED APPLICATIONS

This application is a continuation of U.S. patent application Ser. No. 14/467,618, filed on Aug. 25, 2014, to be issued as U.S. Pat. No. 9,788,591 on Oct. 17, 2017, which is a continuation of U.S. patent application Ser. No. 12/082,920, filed on Apr. 15, 2008, now U.S. Pat. No. 8,813,269, issued on Aug. 26, 2014, which claims the benefit of Provisional Patent Application No. 60/923,603, filed Apr. 16, 2007, which applications are incorporated in their entirety herein by reference and made a part hereof.

FEDERALLY SPONSORED RESEARCH OR DEVELOPMENT

N/A

TECHNICAL FIELD

The invention relates to a protective helmet, namely for contact sports, having a faceguard and a quick release connector that allows for rapid disconnection of the faceguard from the helmet shell by the application of an inwardly directed force, without rotation of the object applying the force. The helmet also includes an adjustable pad assembly featuring a pad member that is brought into contact with an extent of the wearer's head by an inflatable bladder residing between the helmet and the pad member.

BACKGROUND OF THE INVENTION

Helmets for contact sports, such as those used in football, hockey and lacrosse, typically include a shell, a faceguard or face mask, and a chin protector or strap that removably secures the helmet on the wearer's head. The faceguard is rigidly secured to the shell by a plurality of connectors, whereby the faceguard can sustain a number of impacts during the course of play while remaining connected to the shell. Most faceguards include a plurality of intersecting and/or overlapping bars that form openings through which the wearer views the field of play.

One existing faceguard connector is a plastic U-shaped strap member that has a receiver portion that encircles a bar of the faceguard. This strap connector includes a tab portion, wherein a threaded fastener, such as a screw, extends through the tab portion and into the shell to secure the connector and the faceguard to the helmet. Typically, these U-shaped strap connectors are found above the brow region of the shell and along each ear flap to join the faceguard to the shell. A second existing faceguard connector is disclosed in U.S. Pat. No. 6,934,971, which is owned by Riddell Inc., the assignee of the present application. That connector, marketed under the Isolator System brand name, includes a nut, a bushing, a grommet, a rectangular bracket and a threaded fastener (screw). The bracket includes a first channel that receives a first bar of the faceguard and a second channel that receives a second bar, wherein the faceguard bars are positioned between the shell and the bracket. The fastener extends through the bracket and the shell and is received by the nut (residing within the shell) to couple the faceguard to the shell. The threaded fastener is employed to secure the connector to the shell and as a result, a rotational force is applied to tighten for securement and loosen the fastener to permit removal of the bracket and faceguard.

While such conventional faceguard connectors provide a number of benefits, they nevertheless have certain limitations. For example, adjusting and/or removing the faceguard from the shell can be difficult and time consuming. Because a threaded fastener is utilized, rotation of a flat-blade or Phillips screwdriver is required to loosen the fastener to allow for removal of the bracket and the faceguard. In the event a player is injured and/or requires immediate medical attention, the training staff or coaches must undertake the time consuming process of unscrewing the fastener to remove the connector and faceguard in order to gain access to the player's facial area.

Conventional sports helmets include an internal pad assembly that is designed to absorb impacts to the helmet. The internal pad assembly includes a number of pad elements which may be formed from absorbent foam, air, gel or a combination thereof. Air can be utilized as an inflation fluid to adjust the dimensions of the pad element. An example of an inflatable pad assembly of this type is found in U.S. Pat. No. 5,175,889. This type of pad assembly is affixed to the inner surface of the shell and does not fully accommodate the anatomical distinctions among various wearer's heads. Another internal pad assembly that utilizes an inflatable bladder positioned between the shell and the pad elements is disclosed in U.S. Pat. No. 5,014,365 to Schulz. There, a bladder 30 (see FIGS. 2 and 4) is formed from four elongated cells 32*a-d* and is secured to the inner surface of the shell 20 by Velcro® 38*a-d*. A padding assembly 50 includes four pad segments or fingers 52*a-b* that are fastened to a corresponding bladder cell 32*a-d* by Velcro® 34*a-b*. Thus, the pad fingers 52*a-b* are secured in place and cannot pivot when the bladder 30 is inflated. Also, the pad fingers 52*a-b* are spaced a distance apart and do not form a continuous rear padding element that cradles the base of the skull. Because the bladder 30 extends between the lower rear octant and the upper front octant, Schulz states that "the helmet is elevated from the head by pressure applied by the bladder at the upper octants' of the wearer's head." While the pad fingers 52*a-b* of the padding assembly 50 are moveable by operation of the bladder 30, the range of movement is limited by the fact that the lower regions of the padding assembly 50 are coupled to the bladder 30, which is coupled to the inner surface of the helmet shell 20. These structural aspects limit the ability of Schulz's padding assembly 50 to adapt to the anatomical distinctions among various wearers' heads.

The present invention is provided to solve these limitations and to provide advantages and aspects not provided by conventional sports helmets. A full discussion of the features and advantages of the present invention is deferred to the following detailed description, which proceeds with reference to the accompanying drawings.

SUMMARY OF THE INVENTION

The present invention is directed to a helmet that includes a protective shell, a faceguard or face mask, and a faceguard connector assembly that couples the faceguard to the shell and that allows for quick-release of the faceguard.

According to another aspect of the invention, the connector assembly of the helmet includes a bracket and a releasable coupler mechanism that provides for rapid attachment and rapid detachment of the bracket and the faceguard to the shell. The coupler mechanism includes the following components: a head, a sleeve body, a pin, a spring and a washer. The pin and the sleeve extend through an opening in the bracket and an opening in the shell. In a use position, the faceguard is secured to the helmet shell by the connector assembly. The connector assembly is retained in the use position by the engagement between the pin and the washer, the latter of which resides within the helmet shell. To move the connector assembly from the use position, an inwardly directed actuation force is applied to the pin whereby the head, the pin and the sleeve are disconnected from the washer. Once these components are disconnected, the bracket can be detached which allows for rapid removal of the faceguard from the helmet.

According to another aspect of the invention, the helmet also includes an internal padding assembly comprised of a plurality of stationary pad members and at least one adjustable pad assembly. The adjustable pad assembly includes an inflatable bladder and a pad member, wherein the bladder resides between the shell and the rear pad member. The pad member further includes a housing and a pad element enclosed within the housing, wherein the pad element is formed from an injection molding process that provides a unitary pad element. The pad member is brought into contact with a portion of the wearer's head by inflation of the bladder. Thus, the adjustable pad assembly is moveable between a collapsed position and an inflated position, wherein the pad member is angled to engage and cradle a portion of the wearer's head.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
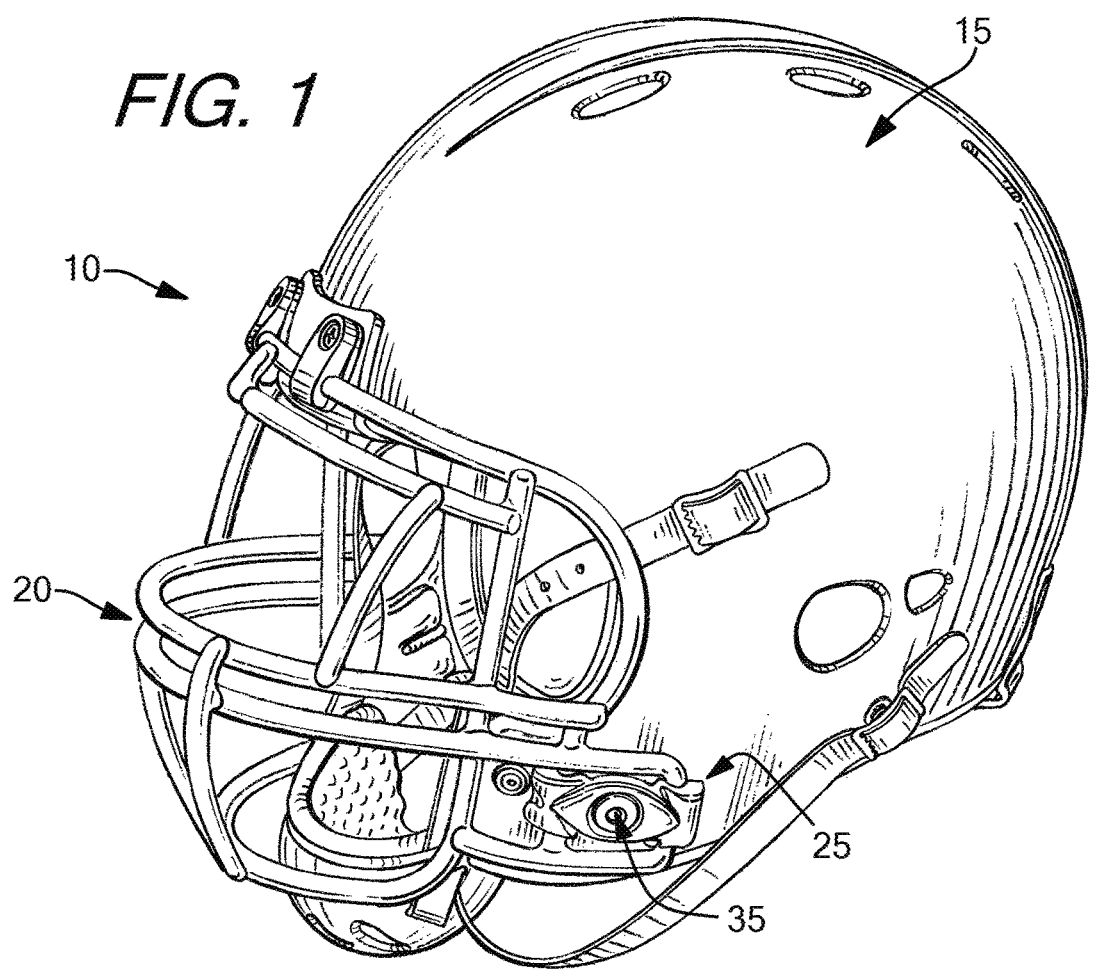
FIG. 1 is a perspective of a protective helmet of the present invention, showing the helmet having a faceguard, a faceguard connector assembly and an internal adjustable padding assembly, collectively in an assembled position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
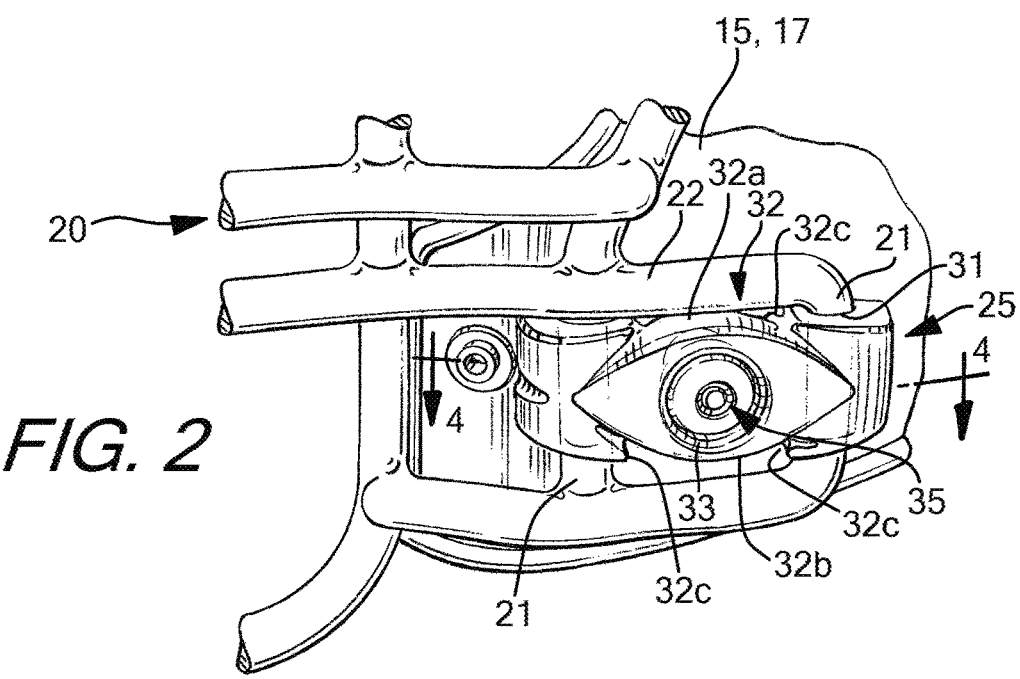
FIG. 2 is a partial view of the helmet, showing the connector assembly securing the faceguard to the helmet shell in the assembled position.
Figure 3:
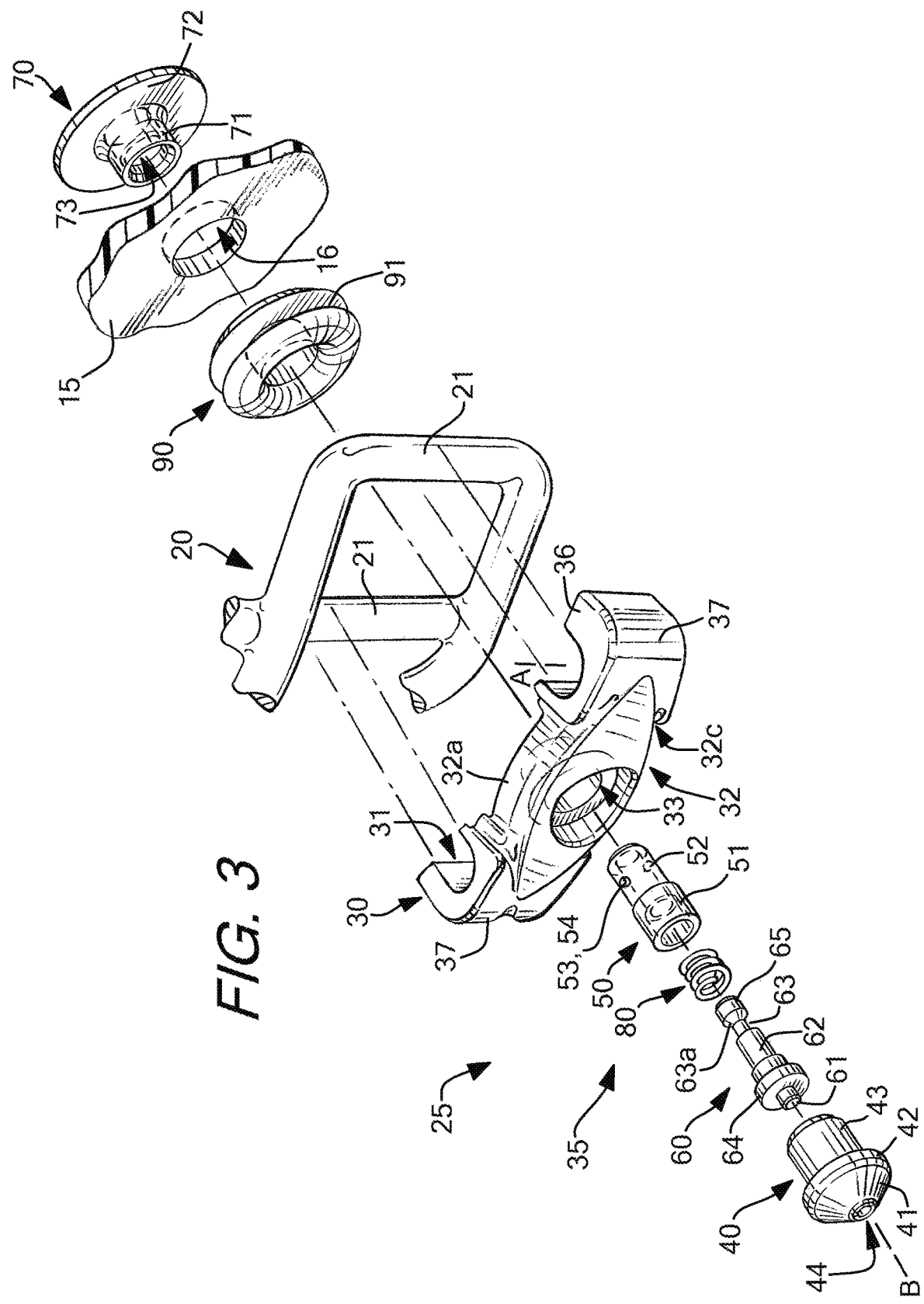
FIG. 3 is an exploded view of the helmet shell, the faceguard and the connector assembly.

FIGS. 1-11 show a protective helmet 10 of the present invention. Although shown as a football helmet, the helmet 10 may be one suitable for use in other sports requiring head protection, such as hockey or lacrosse. In addition, the helmet 10 may be configured for other applications, such as a military helmet having ballistic protection properties. The helmet 10 includes a protective shell 15, a faceguard or face mask 20, and a faceguard connector assembly 25 that couples the faceguard 20 to the shell 15. In FIGS. 1-2, the faceguard 20 includes two vertical members or bars 21 that are secured by the connector assembly 25 against an outer surface of the shell 15. The connector assembly 25 includes a bracket 30 with at least one channel 31, wherein the channel 31 receives a bar 21 of the faceguard 20. In one embodiment, the bracket 30 includes two channels 31 that correspond with the two bars 21 of the faceguard 20. The bracket 30 has a central portion 32 with an opening 33 extending there through and peripheral portions 34, wherein each portion 34 has a channel 31. In another embodiment, the bracket 30 includes a single channel 31 that receives a single bar 21 of the faceguard 20 for coupling to the shell 15. In yet another embodiment, the bracket 30 has channels 31 that are angularly oriented, such as substantially perpendicular. The central portion 32 of the bracket 30 has a curvilinear top wall 32a and a curvilinear bottom wall 32b, wherein the width of the central portion 32 is reduced as the top and bottom walls 32a,b approach the channels 31. Described in a different manner, the thickness of the bracket 30 is reduced in the region where the top and bottom walls 32 a,b converge upon the channel(s) 31. The bracket 30 also includes peripheral end portions 36 about the central portion 32, wherein the end portion 36 preferably has a curvilinear end wall 37. Due to the curvilinear top and bottom walls 32a,b, a recess 32c is formed between the periphery of the respective top and bottom walls 32a,b and the end portion 36. The connector assembly 25 also includes an energy absorbing element, such as grommet 90, positioned between the faceguard 20 and the shell 15. Referring to FIG. 3, the grommet 90 has a circumferential channel 91 that enables the grommet 90 to reside within the shell opening 16.

Figure 6:
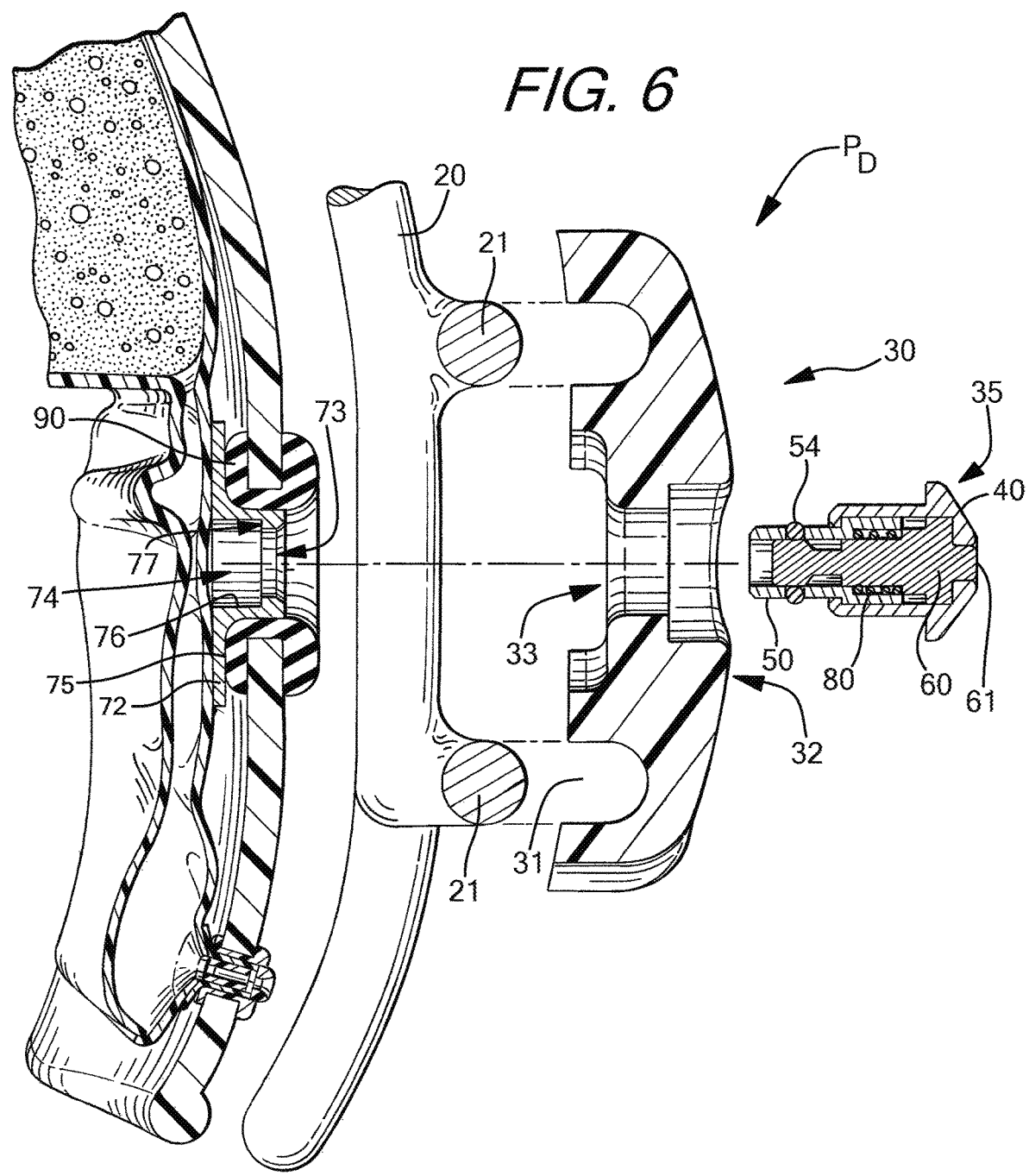
FIG. 6 is a partial cross-section of the helmet, showing a disassembled position of the connector assembly and the faceguard.

The connector assembly 25 further includes a releasable coupler mechanism 35 that provides for rapid attachment and detachment of the bracket 30 and the faceguard 20 from the shell 15 without the deliberate and time-consuming use of a screwdriver (or cutting tool for removal). The releasable coupler mechanism 35 extends through the opening 33 in the bracket 30, the grommet 90 and the shell opening 16. As explained below, the team training staff can easily actuate the releasable coupler 35 to quickly remove the bracket 30 and pivot the faceguard 20 to provide access to the player's facial area. As shown in FIGS. 1-6, the coupler mechanism 35 includes the following components: a head 40, a substantially cylindrical sleeve body 50 having an elongated configuration (see e.g., FIG. 3), an elongated actuator or pin 60, a washer 70 and a spring 80. The head component 40 has a bulbous outer portion 41 with a flange 42, a stem 43 and a central bore 44. The elongated sleeve body 50 has a cylindrical first segment 51 that resides within the stem 43, and a cylindrical second segment 52 that partially resides within the stem 43 and the washer 70. As shown in FIGS. 3-6, the second segment 52 has at least one lateral opening 53 that receives a retractable engaging element, such as retractable ball 54 or a retractable pin. Preferably, the second segment 52 has a pair of opposed lateral openings 53 that each receive a retractable ball 54, whereby the balls 54 are angularly oriented 180 degrees apart. Alternatively, the second segment 52 has a greater number of engaging elementssuch as three balls 54 oriented 120 degrees apart, or four balls 54 oriented 90 degrees apart. The pin 60 has a button portion 61 that is accessible via the central bore 44 extending through the head 40. The pin 60 also includes a main body portion 62, a groove 63 that operably receives the ball 54, a ring 64 with an increased diameter that retains the pin 60 within the sleeve 50, and a distal end portion 65. Depending upon whether the pin 60 is released or depressed, the ball 54 slidingly engages the distal end portion 65 and/or the groove 63. Preferably, the groove 63 has an angled or sloped circumferential wall 63a leading to the distal end portion 65, whereby the wall 63a facilitates movement of the ball 54 into and out of the groove 63. The washer 70 includes a main body portion 71 that extends through the shell opening 16, a flange 72 extending from the main body 71 and a central opening 73. As shown in FIG. 6, the central opening 73 is defined by an internal wall arrangement 74 that includes a first wall segment 75, a second wall segment 76, and a retaining structure, preferably notch 77, separating the first and second wall segments 75, 76. Due to the notch 77, the diameter of the first wall segment 75 is less than that of the second wall segment 76.

Figure 4:
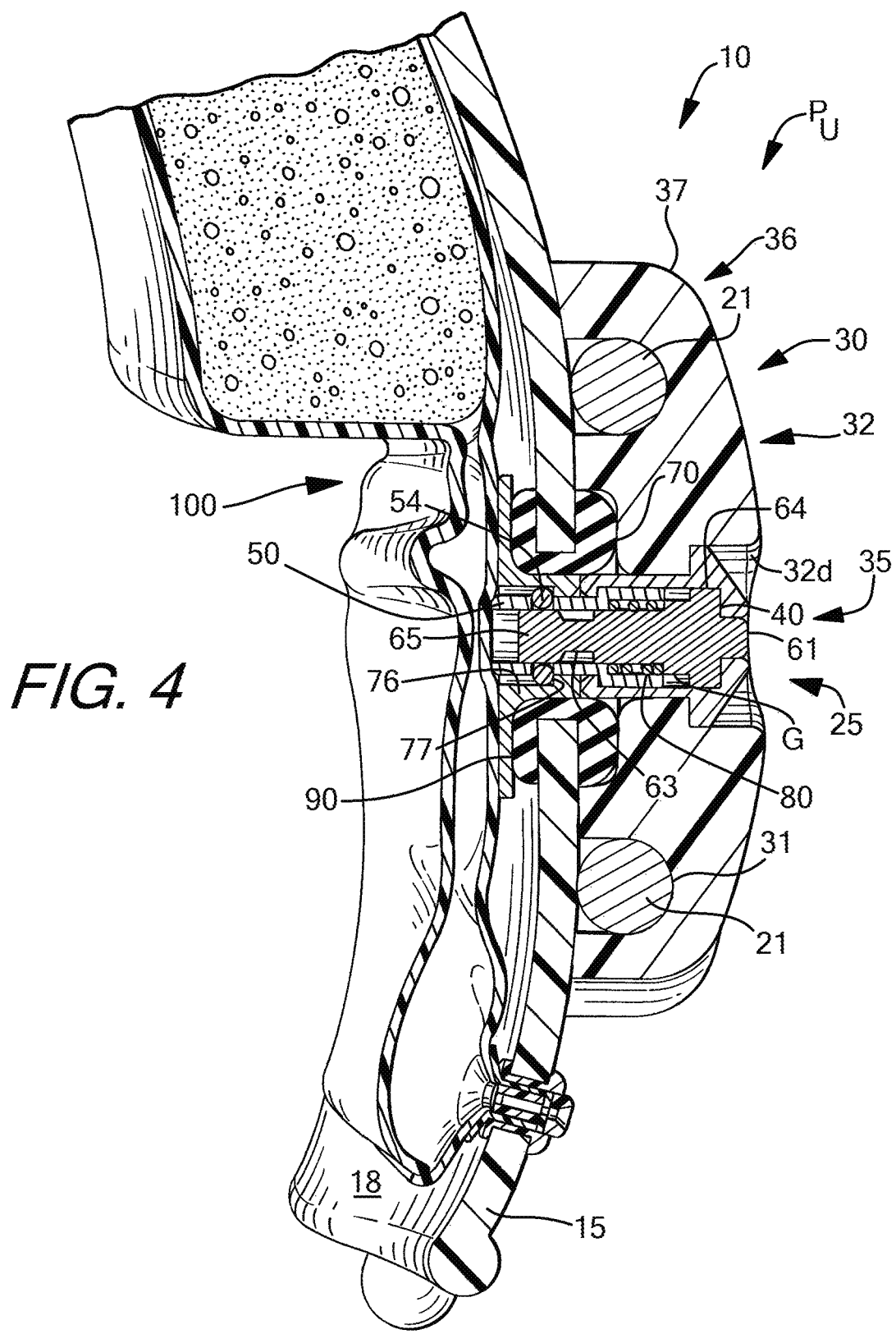
FIG. 4 is a partial cross-section of the helmet taken along line 4-4 of FIG. 2, showing the assembled position.
Figure 5:
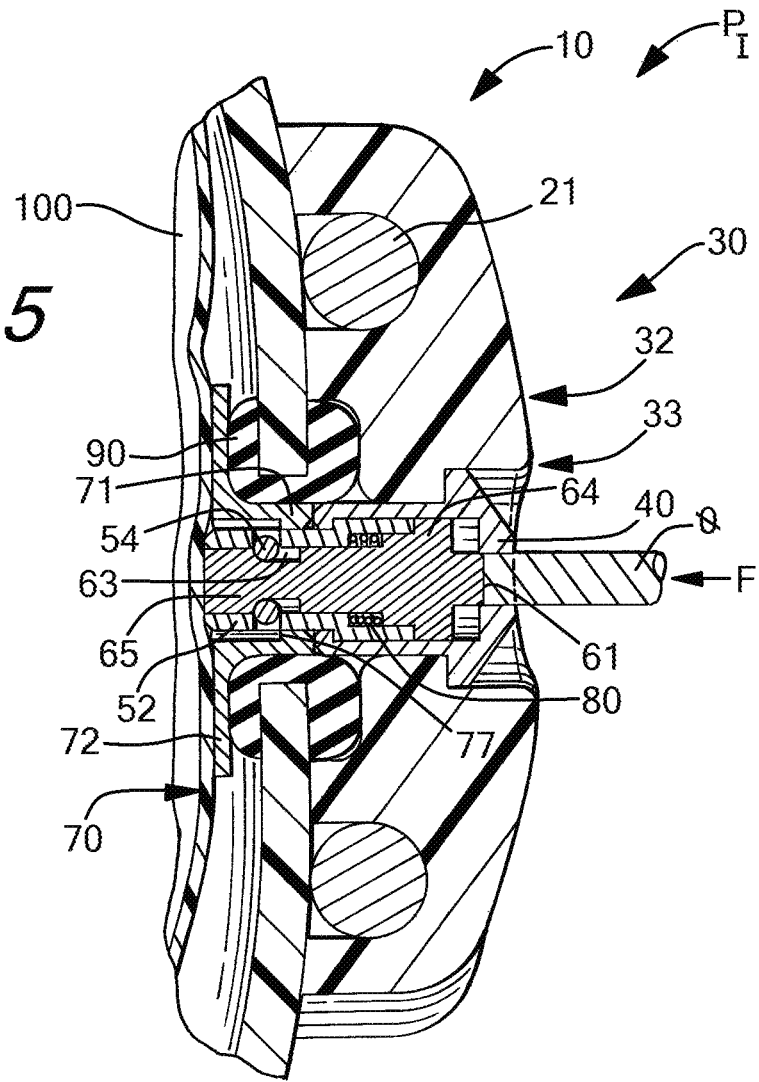
FIG. 5 is a partial cross-section of the helmet, showing the application of an actuation force in an intermediate position.

FIGS. 1, 2 and 4 show the connector assembly 25 securing the faceguard 20 against the helmet shell 15 to define a use position $P_U$. In the use position $P_U$, the two bars 21 of the faceguard 20 reside between the bracket 30 and the outer surface 17 of the shell 15 to secure the faceguard 20 to the shell 15. In the bracket 30 configuration of these Figures, two vertical bars 21 are secured against the shell 15 by the bracket 30. However, the bracket 30 can be configured such that two horizontal bars 22 (see FIG. 2) are secured against the shell 15 by the bracket 30. In the use position $P_U$, the bracket channels 31 are oriented perpendicular to the coupler mechanism 35. Referring to FIGS. 3 and 4, the longitudinal axis A-A of the bracket channels 31 is substantially perpendicular to the longitudinal axis B-B of the coupler mechanism 35, as provided by the pin 60.

In the use position $P_U$, the elongated actuating pin 60 extends through a substantial extent of the head 40, the elongated sleeve body 50 and the washer 70. The head 40 resides within the recess 32d of the central portion 32 and the pin button 61 is accessible such that it can be depressed to allow the head 40, the bracket 30 and the faceguard 20 to be disconnected from the washer 70 and the shell 15. Preferably, the pin button 61 is recessed a small amount from the outer surface of the head 40 such that the pin 60 is not inadvertently actuated during the course of play. The ring 64 of the pin 60 is longitudinally positioned a distance from the outer edge of the first segment 51 of the sleeve 50 such that a gap G is formed there between. As explained below, the gap G provides clearance for movement of the pin 60 and is reduced as the pin 60 is actuated. The spring 80 receives an extent of the pin 60 and resides within the sleeve 50, namely against the notch between the first and second segments 51, 52. In the use position $P_U$, the spring 80 is not compressed and does not exert a force upon the pin 60. The washer 70 resides between an inner surface 18 of the shell 15 (or the grommet 90) and the internal padding assembly 100 and is retained there between when the bracket 30 and the coupler mechanism 35 are disconnected. Depending upon its length, the main body flange portion 71 extends through the shell opening 17 to adjoin the internal end of the flange 40.

The connector assembly 25 is retained in the use position $P_U$ by the engagement between the ball 54, the retaining notch 77 and the distal end segment 65 of the pin 60. The ball 54 is positioned against the notch 77 and inward movement of the ball 54 is prevented by the end segment 65. While inward movement of the ball 54 is precluded by the end segment 65, outward movement of the ball 54 is precluded by the second wall segment 76. Due to the position of the pin 60, the groove 63 is misaligned with the ball 54. The spring 80 is selected with a spring constant (k) sufficient to prevent unintended movement of the pin 60. The interaction of these components prevents disconnection of the connector assembly 25 until the button 61 is actuated. The dual nature of the interaction between the spring 80 and the pin 60, and the ball 54, the end segment 65 and the retaining notch 77 causes the coupler mechanism 35 to be in tension to maintain the use position $P_U$.

To move the connector assembly 25 from the use position $P_U$ through a intermediate position $P_I$ to a disconnected position $P_D$ (see FIG. 6), an inwardly directed actuation force F (see FIG. 5) is applied to the pin 60 by an object O. In the intermediate position $P_I$ of FIG. 5, the actuation force F displaces the pin 60 within the sleeve 50 and towards the washer 70 such that the groove 63 aligns with the ball 54 to permit movement of the ball 54 into the groove 63. When the distal end segment 65 no longer engages the ball 54, the ball 54 moves into the groove 63. This movement is facilitated by the sloped circumferential wall 63a that slidingly engages the ball 54. The displacement of the pin 60 towards the washer 70 eliminates the gap G (between the pin ring 64 and the first sleeve segment 51) and compresses the spring 80. The movement of the ball 54 into the groove 63 disengages the ball 54 from the washer notch 77 which enables the majority of the coupler mechanism 35—the sleeve 50, pin 60, head 40 and spring 80—to be disconnected from the washer 70 by the application of an outwardly directed removal force (not shown) typically applied by an operator. While movement of the pin 60 and the balls 54 is occurring, the head 40, the sleeve 50 and the washer 70 remain substantially stable. When the ball 54 is received by the groove 63, the ball 54 no longer engages the notch 77 and obstructs removal of the coupler 35 from the washer 70. Once these components are disconnected, the bracket 30 can be removed to allow for removal of the faceguard 20 to arrive at the disconnected position $P_D$ of FIG. 6.

If the actuation force F is released from the pin 60 in the intermediate position $P_I$ prior to removal of the bracket 30, the compressed spring 80 exerts an outwardly directed force (opposite the actuation force F) on the pin 60 causing it to slide within the sleeve 50 towards the head 40 such that the ball 54 is forced from the groove 63 and along the angled wall 63a to reside against the distal end 65 of the pin 60. In the event only two connector assemblies 25 are utilized, such as one connector assembly 25 on each ear flap of the shell 15, the disconnection of the bracket 30 allows the faceguard 20 to be pivoted about the two conventional connectors residing along the brow region of the helmet 10. In another configuration employing only connector assemblies 25 to secure the faceguard 20—with one connector assembly 25 at each ear flap of the shell 15 and at least one connector assembly 25 at the brow region of the shell 15—the actuation force F allows for the complete and rapid removal of the faceguard 20, not just pivoting of the faceguard 20.

The actuation force F is applied substantially perpendicular or normal to the outer surface of the helmet shell 15, the head 40 and/or the bracket 30, and can be applied by a coach, a member of the training staff, or another player. Assuming the helmet 10 has a longitudinal axis extending vertically through the shell 15, the actuation force F is applied substantially perpendicular to the longitudinal axis. Described in a different manner, the actuation force F is applied substantially perpendicular to a faceguard interface area, which is defined as the area of the faceguard bars 21 that interact with the bracket 30. Depending upon the configuration of the pin 60 and the head 40, the object O that applies the actuation force F can be a pointed probe, a small key or a pen. Unlike conventional faceguard connectors that employ a threaded fastener (or screw) which requires rotation for loosening and removal, the actuation force F does not include a rotational component. Thus, the actuation force F lacks the time-consuming rotational component and provides a more efficient disconnection process.

To attach the connector assembly 25 and secure the faceguard 20 to the helmet 10, an operator aligns the bracket 30 and the faceguard 20 and then inserts the coupler mechanism 35 through the bracket 30 for reception with the washer 70 residing between the padding assembly 100, the grommet 90 and the shell 15. Next, the operator applies the inwardly directed actuation force F in the manner described above, whereby the ball(s) 54 retracts into the groove 63 to allow for further insertion of the sleeve 50 into the washer 70. Once the sleeve 50 has been sufficiently inserted into the washer 70, the actuation force F is released whereby the retracted ball 54 is deployed from the groove 63 into engagement with the retaining notch 77. As explained above, the interaction between the ball 54, the notch 77 and the distal end segment 65 of the pin 60 retain the connector assembly 25 in the use position $P_U$.

Figure 7:
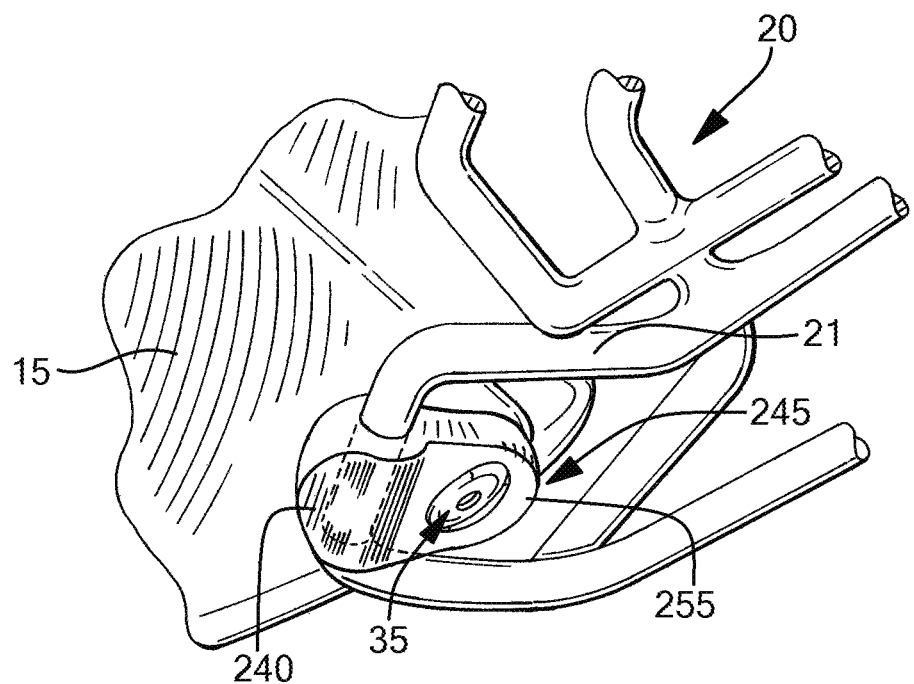
FIG. 7 is a partial view of the helmet, showing another embodiment of the connector assembly securing the faceguard to the helmet shell in the assembled position.
Figure 8:
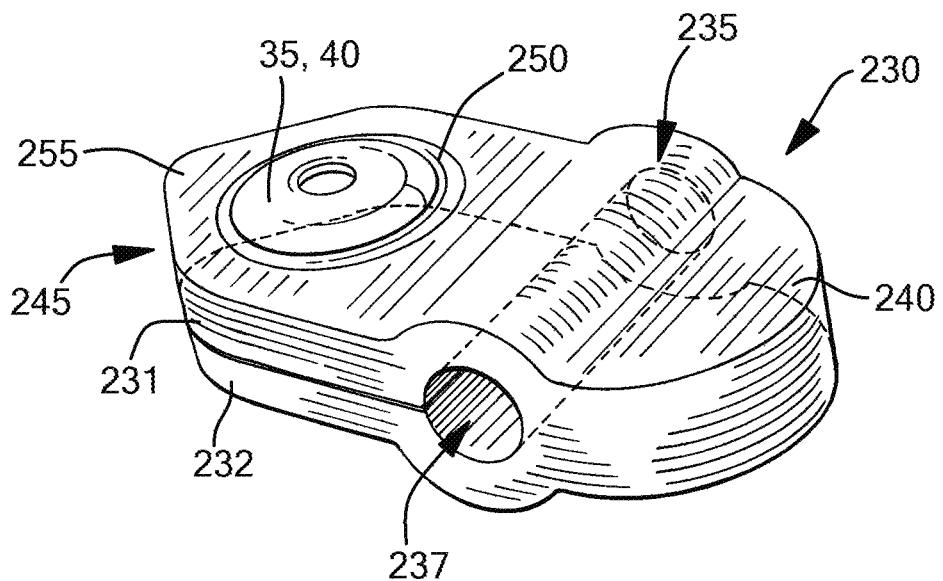
FIG. 8 is a perspective view of the connector assembly of FIG. 7.

FIGS. 7 and 8 show another embodiment of the connector assembly 225 which includes a bracket 230 with a band or strap member 235 that wraps around the faceguard bar 21. Described differently, the band 235 forms a receiver 237 that encircles the bar 21. This is contrary to the U-shaped channels 31 of the bracket 30 that receive the bar 21, but do not encircle it. Therefore, the bracket 230 includes a single, encircling point for the faceguard 20, not the two receiving points provided by the channels 31 of the bracket 30. The band 235 further includes a peripheral flange 240 and a tab portion 245 with an opening 250 that receives the coupler assembly 35. The tab 245 may include an angled tip 255 that conforms to the shape of the helmet 10. Preferably, the bracket 230 has a "clam-shell" design such that it opens about a hinged flange 240 to receive the faceguard bar 21. Due to the clam shell configuration, the bracket 230 has an upper half 231 and a lower half 232 that meet at a seam leading to the receiver 237.

Referring to FIGS. 9-13, the protective helmet 10 also includes an internal padding assembly 100 comprised of a plurality of stationary pad members 105 and at least one adjustable pad assembly 110. The stationary pad members 105 are removably connected to the inner surface 18 of the shell 15 and may include jaw pads 106, crown pads 107, ear flap pads 108, and front pad 109. The helmet 10 may also include a rear trim piece 111 that wraps around the lower edge of the shell 15. The adjustable pad assembly 110 includes an inflatable member or bladder 115 and an adjustable pad member 125, preferably a rear pad member 125, wherein the bladder 115 resides between the shell 15 and the rear pad member 125. The trim piece 111 can be configured to provide support to the rear pad member 125 through the range of adjustability. As explained in detail below, the rear pad member 125 is brought into contact with a rear portion of the wearer's head by the bladder 115. Thus, the adjustable pad assembly 110 is moveable between a collapsed position $P_C$, and an inflated position $P_I$ wherein the rear pad member 120 is angled to engage the base of the wearer's head (proximate the brain's occipital lobe and the cerebellum). Although existing sports helmets include inflatable pad members that can, to some extent, compensate for anatomical variances in the wearer's head 40, the inventive adjustable pad assembly 110 features a pad member 125 that engages and cradles the base of the wearer's head to reduce the likelihood of the helmet 10 rotating forward from an impact. While shown as having a single adjustable pad assembly 110, the helmet 10 may have a number of adjustable pad assemblies 110 that reduce the likelihood of helmet 10 rotation. For example, the helmet 10 can have an adjustable front and rear pad assemblies 110.

Figure 11:
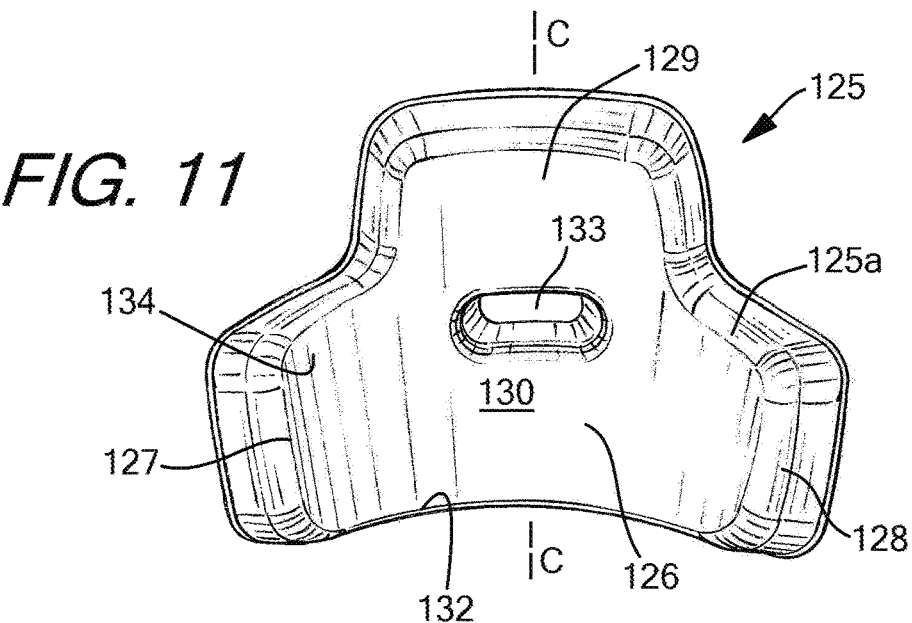
FIG. 11 is a front perspective view of a pad member of the adjustable padding assembly.
Figure 12:
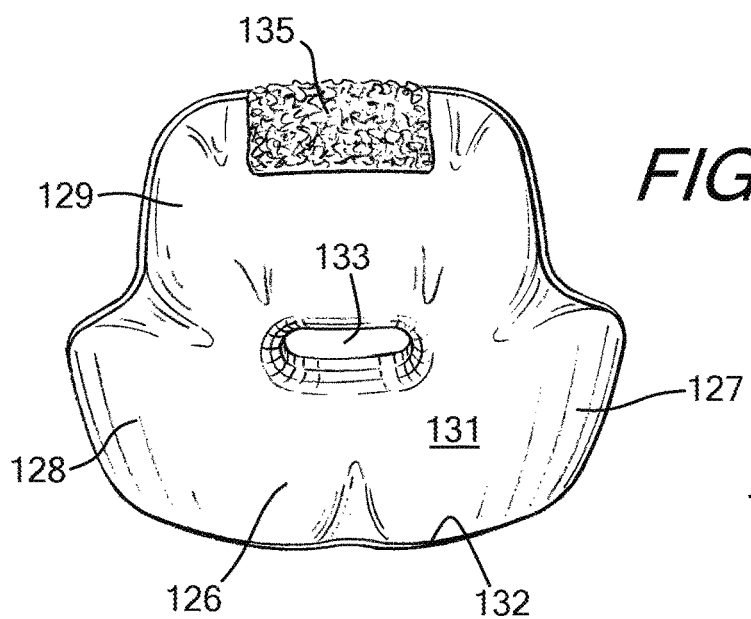
FIG. 12 is a rear perspective view of the pad member of the adjustable padding assembly; and, FIG. 13 is a side perspective view of the pad member of the adjustable padding assembly.
Figure 13:
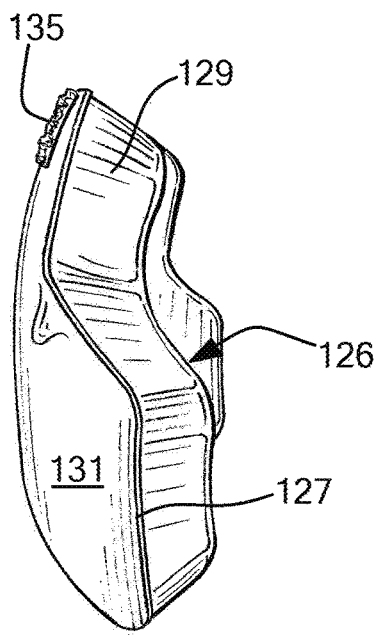

As shown in FIGS. 11-13, the rear pad member 125 has a central portion 126, a first lateral portion or lobe 127, a second lateral portion or lobe 128 and an upper portion or lobe 129. The first, second and upper lobes 127, 128, 129 extend outward from the central portion 126. The central portion 126 also includes at least one opening 133 that can receive a product label or identifier. Preferably, the pad member 125 has a recessed configuration resulting in curvilinear inner and outer surfaces 130, 131, and a curvilinear lower edge 132. Referring to FIG. 12, the pad member 125 is symmetric about a vertical axis C-C. The pad member 125 further includes a housing 125a, preferably formed from vinyl, and a pad element 134 enclosed within the housing 133. In a preferred embodiment and in contrast to conventional helmet padding, the pad element 134 is formed from an injection molding process that provides a unitary pad element with a number of benefits, including increased design freedom with respect to the pad element configuration, reduced weight, increased durability, and increased structural rigidity. Alternatively, the pad member 125 includes a number of discrete molded pad elements that interact and form an assembly within the housing 133. In another embodiment, the pad element 134 has a multi-layer construction, for example, an open-cell layer adjoining a closed-cell layer. The pad member 125 includes means for securing 135 the pad member 125 to either the shell 15 or the bladder 115. The securing means 135 can be an elongated fastener, such as a rivet, hook and pile materials (Velcro®), or a resilient adhesive, such as tape or heat activated glue. In conjunction with the bladder 115, the securing means 135 allows for pivotal movement of the pad member 125 between the collapsed position $P_C$ and the inflated position $P_I$.

Figure 9:
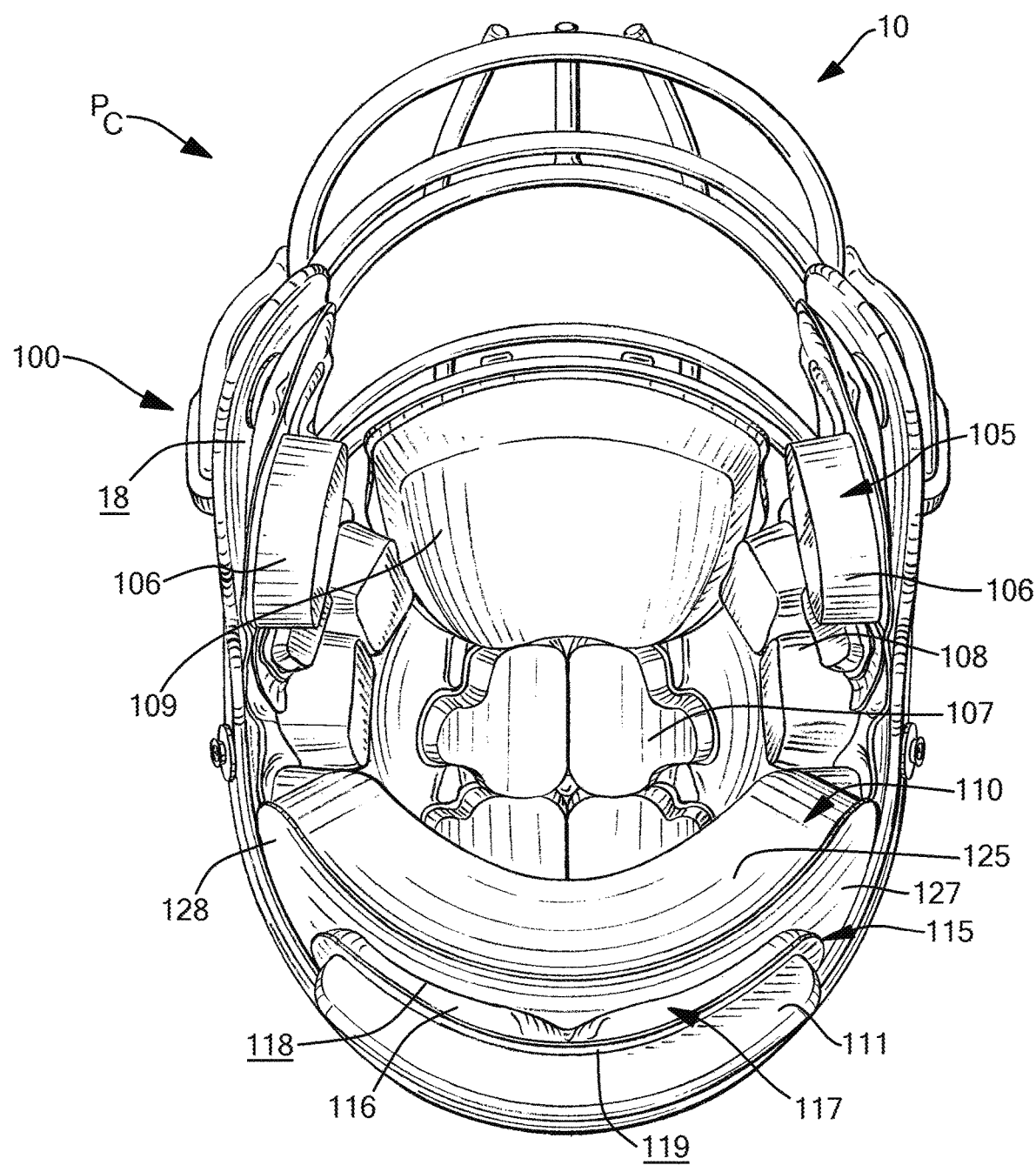
FIG. 9 is a perspective view of the helmet, showing an internal adjustable padding assembly in a collapsed position.
Figure 10:
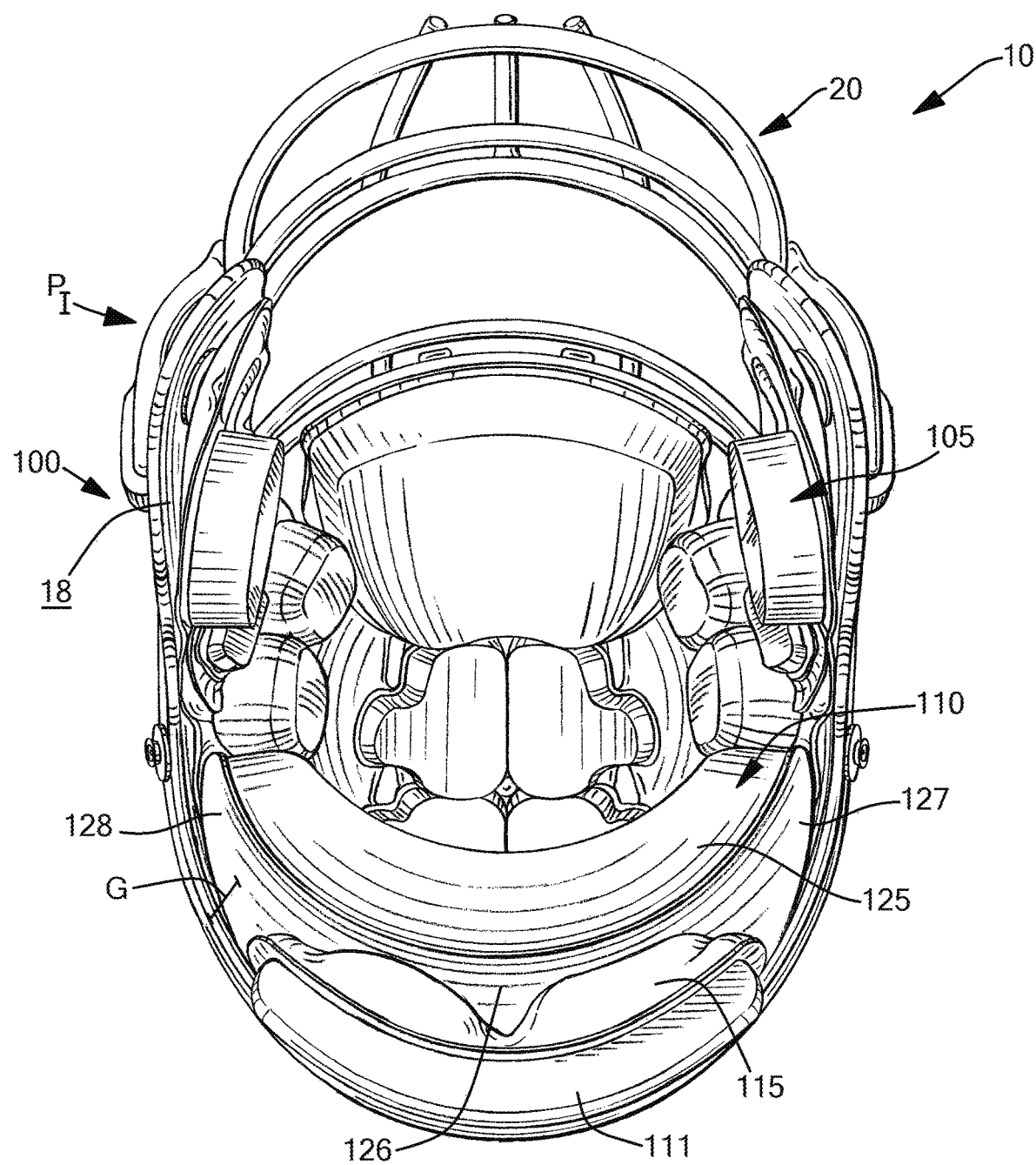
FIG. 10 is a perspective view of the helmet, showing the inflatable padding assembly in an inflated position.

The bladder 115 is an inflatable reservoir that is affixed to the inner surface 18 of the shell 15 behind the rear pad member 125. The bladder 115 includes a casing 116 and an internal fluid reservoir 117. The bladder 115 is in fluid communication with an inflation valve 140 that preferably extends through the shell 15, or is integrated with the bladder 115. As shown in FIGS. 9 and 10, the bladder 115 has a curvilinear configuration that substantially corresponds to the radius of curvature of both the shell 15 and the pad member 125. Once installed, a first surface 118 of the bladder 115 engages the pad member 125 and a second surface 119 engages the inner surface 18 of the shell 15. Preferably, the bladder 115 has an arc length that is less than the arc length of the pad member 125, wherein the bladder 115 does not make contact with the first and second lateral lobes 127, 128 of the pad member 125.

As mentioned above, the pad member 125 and the bladder 115 interact as the adjustable pad assembly 110 is moved between the collapsed position $P_C$ and the inflated position $P_I$. In the collapsed position $P_C$, the bladder 115 is substantially or completely deflated and the first and second lateral lobes 127, 128 of the pad member 125 are positioned proximate to the inner surface 18 of the shell 15, which results in only a minimal gap G between the bladder 115 and the pad member 125. Depending upon the anatomical aspects of the wearer's head, the pad member 125 may engage the base of the wearer's head. To reach the inflated position $P_I$, an inflation fluid, such as air or water, is delivered through the valve assembly 140 to the bladder 115. As it is inflated, the bladder 115 causes the pad member 125 to be pivoted about the securing means 135 and towards the central portion of the shell 15. In the inflated position $P_I$, the bladder 115 engages the central portion 126 of the pad member 125, however, there is a larger gap G between the first and second lateral lobes 127, 128 and the shell 15. When the helmet 10 is worn by a player and the inflated position $P_I$ is attained, the pad member 125 engages the base of the player's skull at the occipital lobe and cerebellum regions of the brain. Due to its curvilinear configuration and the first and second lateral lobes 127, 128, the pad member 125 cradles the player's head to reduce the chance of the helmet 10 rotating from an impact. Although not shown, the adjustable pad assembly 110 can reach an intermediate or partially inflated position where the gap G is less than that shown in FIG. 10, however, the pad member 125 still engages the base of the player's skull as explained above. The intermediate position is particularly useful for a player having different anatomical head 40 characteristics.

While the specific embodiments have been illustrated and described, numerous modifications come to mind without significantly departing from the spirit of the invention, and the scope of protection is only limited by the scope of the accompanying Claims.

We claim:

1. A football helmet, comprising:
   a shell having an opening;
   a faceguard;
   a quick release connector assembly that secures the faceguard to the shell in a use position, the quick release connector assembly including:
      a bracket having a recess and a first opening;
      a washer lacking internal threads and having a cylindrical main body that extends substantially perpendicular from a flange of the washer, the cylindrical main body of the washer having an opening;
      an elongated body having: (i) a first segment with an outer periphery that defines a first outer diameter and (ii) a second segment that lacks external threads and has an outer periphery that defines a second outer diameter, and wherein the first outer diameter of the elongated body is different than the second outer diameter of the elongated body;
      a head connected to the elongated body, the head having an outer diameter that is greater than the first opening in the bracket; and
      wherein in the use position:
         (i) an extent of the cylindrical main body of the washer is positioned within the opening in the shell,
         (ii) an extent of the first segment of the elongated body extends into the first opening in the bracket,
         (iii) an extent of the second segment of the elongated body extends into the opening in the cylindrical main body of the washer and into the opening in the shell, and
         (iv) the head is substantially within the recess in the bracket.

2. The football helmet of claim 1, wherein the quick release connector assembly is movable from the use position to a disconnected position by an application of a force that is applied to an extent of the quick release connector assembly to disconnect the elongated body from the washer, thereby allowing for rapid removal of the bracket from the shell.

3. The football helmet of claim 2, wherein the application of the force does not cause the head to make one complete rotation.

4. The football helmet of claim 2, wherein the application of the force does not cause the head to rotate.

5. The football helmet of claim 1, wherein the elongated body has no more than two segments.

6. The football helmet of claim 1, wherein in the use position, the second segment of the elongated body (i) does not extent through the flange of the washer, and (ii) is substantially encircled by the main body of the washer.

7. The football helmet of claim 1, wherein in the use position, the first segment of the elongated body does not extend through the opening in the shell.

8. The football helmet of claim 1, wherein the elongated body has an opening that spans an end wall of the second segment.

9. The football helmet of claim 1, wherein the second segment of the elongated body has an engaging structure, the main body of the washer has an internal engaging structure, and wherein the internal engaging structure of the main body of the washer engages the engaging structure of the second segment of the elongated body in the use position.

10. The football helmet of claim 9, further comprising a spring that is retained by a notch formed between the first segment of the elongated body and the second segment of the elongated body, and wherein the spring exerts a biasing force in the use position to prevent disengagement of the internal engaging structure of the washer from the engaging structure of the second segment of the elongated body.

11. The football helmet of claim 10, wherein the quick release connector assembly is movable from the use position to a disconnected position by an application of a force that is applied to the head to rapidly disconnect the elongated body from the washer, said force application compresses an extent of the spring to overcome said biasing force.

12. A football helmet, comprising:
   a shell having an opening;
   a faceguard;
   a quick release connector assembly that secures the faceguard to the shell in a use position, the quick release connector assembly including:
      a bracket having a tab, the bracket encircling a portion of the faceguard, the tab having a recess and an opening;
      a washer lacking internal threads and having a tubular main body that extends perpendicular from a flange of the washer, the tubular main body of the washer having both a central opening and an internal engaging structure;
      an elongated body lacking external threads and having both an outer diameter and an engaging structure;

a head connected to the elongated body, the head having an outer diameter that is greater than both the outer diameter of the elongated body and the opening in the tab of the bracket;

a biasing member operably engaged with an extent of the elongated body;

wherein in the use position:
  (i) an extent of the washer flange engages an inner surface of the shell;
  (ii) a first portion of the elongated body extends through the opening in the tab of the bracket;
  (iii) a second portion of the elongated body extends into the opening in the tubular main body of the washer;
  (iv) the elongated body does not extend through the flange of the washer;
  (v) the head is substantially within the recess in the tab of the bracket; and
  (vi) the biasing member exerts a biasing force to prevent disengagement of the internal engaging structure of the washer from the engaging structure of the elongated body.

13. The football helmet of claim 12, wherein the elongated body has an opening that spans an end wall.

14. The football helmet of claim 12, wherein the flange and the opposing end of the main body defining a length of the washer, wherein the internal engaging structure is positioned near the midpoint of said length.

15. The football helmet of claim 12, wherein the quick release connector assembly is movable from the use position to a disconnected position by an application of an inwardly directed force that is applied to the head to rapidly disconnect the elongated body from the washer, thereby allowing for rapid removal of the bracket from the shell.

16. The football helmet of claim 15, wherein the spring is compressed an extent to overcome said biasing force when the inwardly directed force is applied to the head.

17. The football helmet of claim 15, wherein the application of the inwardly directed force does not cause the head to make one complete rotation.

18. The football helmet of claim 17, wherein the application of the inwardly directed force does not cause the head to rotate.

19. A sports helmet comprising:
a shell having an opening;
a faceguard;
a quick release connector assembly that secures the faceguard to the shell in a use position, the quick release connector assembly including:
  a washer having a main body that extends from a flange of the washer, the main body having a central opening and an internal engaging structure;
  a sleeve having a central opening and a lateral opening;
  a pin having a first section and a second section, wherein at least an extent of the first section of the pin is positioned within the central opening in the sleeve;
  a retractable engaging element that is configured to operably engage with the second section of the pin;
  wherein in the use position:
    (i) an extent of the sleeve extends through the first opening in the bracket,
    (ii) an extent of the second segment of the pin extends into the opening in the main body of the washer, and
    (iii) an extent of the retractable engaging element extends through the lateral opening in the sleeve and engages the internal engaging structure of the main body.

20. The football helmet of claim 19, wherein the quick release connector assembly is movable from the use position to a disconnected position by an application of a force that is applied to an extent of the quick release connector assembly to disconnect the retractable engaging element from the internal engaging structure of the main body, thereby allowing for rapid removal of the bracket from the shell.

21. The football helmet of claim 20, wherein the application of the force does not cause the head to rotate.

22. The football helmet of claim 21, wherein the force is an inwardly directed force.

23. The football helmet of claim 19, wherein the central opening in the sleeve has a first portion having a first diameter and a second portion having a second diameter, said first diameter is larger than the second diameter.

24. The football helmet of claim 19, wherein the second section of the pin has a first portion that has a first diameter and a second portion that has a second diameter, wherein said first diameter is larger than the second diameter.

25. The football helmet of claim 19, wherein the second section of the pin has a first portion that has substantially parallel walls and a second portion that has substantially sloped walls, said substantially parallel wall operably engage the retractable engaging element in the use position and the substantially sloped wall in a disconnected position.

26. The football helmet of claim 1, further comprising an internal padding assembly that is positioned between the shell and the wearer's head, when the helmet is worn by the wearer, wherein an extent of the internal padding assembly is formed using an injection molding process.

27. The football helmet of claim 26, wherein the internal padding assembly has a multi-layered construction.

28. The football helmet of claim 26, wherein the internal padding assembly is coupled to an inner surface of the shell using adhesive.

29. The football helmet of claim 19, further comprising an internal padding assembly that is positioned between the shell and the wearer's head, when the helmet is worn by the wearer, wherein the internal padding assembly has a multi-layered construction and is coupled to an inner surface of the shell using adhesive.

30. The football helmet of claim 29, wherein an extent of the internal padding assembly is formed using an injection molding process.

* * * * *